United States Patent [19]

Noguchi et al.

[11] Patent Number: 4,941,564
[45] Date of Patent: Jul. 17, 1990

[54] METHOD OF AND APPARATUS FOR TRANSFERRING MOTORCYCLE

[75] Inventors: Hiroyuki Noguchi; Makoto Makino; David M. Nye, all of Marysville, Ohio

[73] Assignee: Honda Giken Kogyo Kabushiki Kaisha, Tokyo, Japan

[21] Appl. No.: 333,908

[22] Filed: Apr. 6, 1989

[51] Int. Cl.$^5$ .......................................... B65G 37/00
[52] U.S. Cl. ................................................. 198/468.2
[58] Field of Search .................... 198/468.2; 414/751, 414/753; 104/165

[56] References Cited

U.S. PATENT DOCUMENTS 4,715,774 12/1987 Magnuson ........................... 414/751
4,757,608 7/1988 Ochi ................................ 414/751 X
4,784,422 11/1988 Jones et al. ...................... 414/751 X Primary Examiner—Robert J. Spar
Assistant Examiner—Cheryl L. Gastineau

[57] ABSTRACT

A motorcycle being assembled on an assembly line is transferred from a first line to a second line by gripping and lifting a front wheel of the motorcycle up to a prescribed height to support the motorcycle only through a rear wheel thereof, moving the motorcycle from the first line to the second line while rolling the rear wheel, clamping the rear wheel, and thereafter lowering the front wheel to move the motorcycle along the second line. The motorcycle can automatically be transferred reliably and efficiently, and various motorcycles of different types can easily be transferred by a single apparatus by only gripping front wheels thereof.

25 Claims, 9 Drawing Sheets

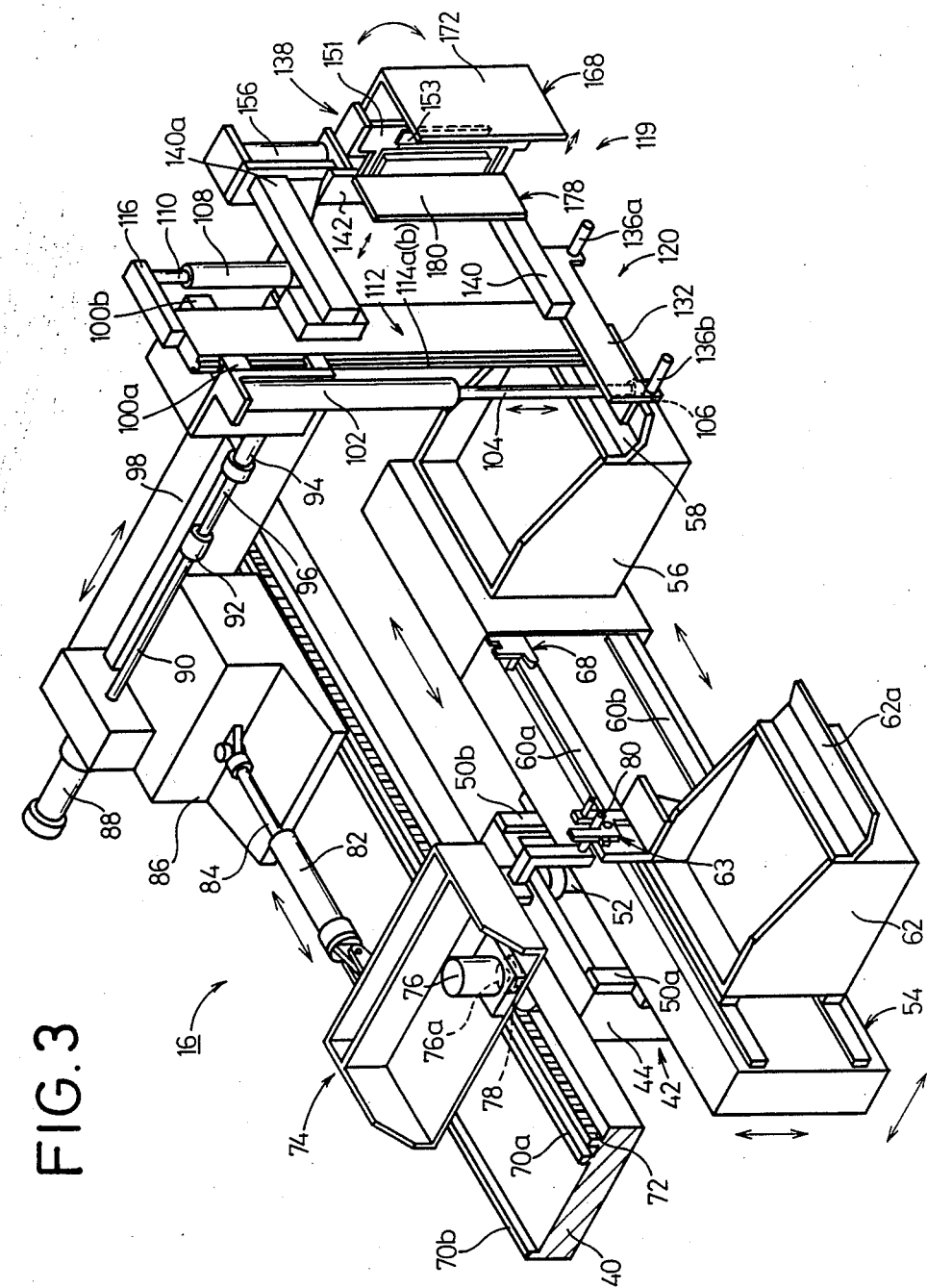

METHOD OF AND APPARATUS FOR TRANSFERRING MOTORCYCLE

BACKGROUND OF THE INVENTION

1. Field of the Invention

The present invention relates to a method of and an apparatus for transferring a motorcycle, and more particularly to a method of and an apparatus for transferring a motorcycle from a first conveyor line along which an engine mounted on the motorcycle is disposed on a movable base and various components such as a front wheel, a rear wheel, and the like are installed on the motorcycle, to a second conveyor line along which remaining components such as a muffler and the like are installed on the motorcycle, by first gripping the front wheel and moving the front wheel upwardly of the rear wheel and then rolling the rear wheel only to move the motorcycle from the first conveyor line to the second conveyor line, so that the motorcycle can automatically and efficiently be transferred, and motorcycles of different kinds can easily be transferred from the first conveyor line to the second conveyor line.

2. Description of Background Art

Known motorcycle assembly lines generally include a first line along which an engine mounted on a motorcycle is disposed on a movable base and conveyed thereby and various components such as a frame, a front wheel, a rear wheel, and the like are installed on the motorcycle, and a second line along which remaining components such as a muffler, a cowling, and the like are installed on the motorcycle while clamping and conveying the rear wheel that has been attached to the motorcycle.

Since the assembly line is composed of the first line which holds and conveys the engine and the second line which holds and conveys the rear wheel, the motorcycle has to be transferred from the first line to the second line, and the transfer process has heretofore been effected by the worker himself.

More specifically, a transfer device such as a hoist crane is movably disposed between the first and second lines. The motorcycle positioned on the first line is suspended by the worker from the transfer device through a belt or the like. Then, the motorcycle is transferred from the first line to the second line by the transfer apparatus, after which the motorcycle is unhooked from the transfer device and then clamped on the second line.

Inasmuch as the transfer of the motorcycle from the first line to the second line is entirely dependent on the worker, the worker tends to be mentally and physically overstrained, and the motorcycle is apt to be damaged by contact with surrounding parts when it is attached to and detached from the transfer apparatus. Moreover, the entire assembly line cannot be automatized and made efficient, and fails to meet a demand for higher mass production capability.

SUMMARY OF THE INVENTION

It is a principal object of the present invention to provide a method of and an apparatus for transferring a motorcycle from a first line to a second line by gripping and raising a front wheel of the motorcycle up to a prescribed height to support the motorcycle only through a rear wheel thereof, moving the motorcycle from the first line to the second line while rolling the rear wheel, clamping the rear wheel, and thereafter lowering the front wheel to move the motorcycle along the second line, so that the motorcycle can automatically be transferred reliably and efficiently, and various motorcycles of different types can easily be transferred by a single apparatus by gripping front wheels thereof only.

Another object of the present invention is to provide a method of transferring a motorcycle being assembled from a first line to a second line, comprising the steps of: gripping one of the wheels of the motorcycle with a wheel gripping mechanism; lifting the gripped wheel to support only the other wheel of the motorcycle on a transfer path; thereafter, moving said wheel gripping mechanism toward the second line to roll said other wheel over said transfer path onto the second line; lowering said one wheel onto the second line; and releasing said one wheel from said wheel gripping mechanism.

Still another object of the present invention is to provide a method of transferring a motorcycle, wherein said first line has a first conveyor for conveying the motorcycle with both the wheels supported above the first conveyor, and said second line has a second conveyor for conveying the motorcycle with both the wheels placed on the second conveyor, wherein the rear wheel of the motorcycle, which is said one wheel, is gripped by said wheel gripping mechanism, said gripped wheel is lifted to place the rear wheel of the motorcycle, which is said other wheel, on a rear wheel transfer base, then said wheel gripping mechanism and said rear wheel transfer base are moved in synchronism toward the second line, and only said rear wheel transfer base is stopped at a prescribed position to roll the rear wheel over said rear wheel transfer base onto the second line, and wherein after said rear wheel is clamped, said front wheel is placed on the second line and released from said wheel gripping mechanism.

Yet another object of the present invention is to provide a method of transferring a motorcycle, wherein when said front wheel of the motorcycle placed on said first conveyor of the first line is to be gripped, said front wheel is angularly adjusted so that the axis of the front wheel is directed perpendicularly to a longitudinal direction of the motorcycle.

Yet still another object of the present invention is to provide a method of transferring a motorcycle, wherein when said front wheel is to be lifted to place said rear wheel on the rear wheel transfer base, said first conveyor is lowered out of physical interference with movement of said rear wheel transfer base.

A further object of the present invention is to provide an apparatus for transferring a motorcycle being assembled from a first line to a second line, comprising: a wheel gripping mechanism for gripping one of the wheels of the motorcycle, said wheel gripping mechanism being reciprocally movable between the first and second lines; and a wheel transfer base for placing the other wheel of the motorcycle, said wheel transfer base being reciprocally movable between the first line and a prescribed position on the second line in synchronism with said wheel gripping mechanism.

A still further object of the present invention is to provide an apparatus for transferring a motorcycle, wherein said first line has a first conveyor for conveying the motorcycle with both the wheels supported above the first conveyor, and said second line has a second conveyor for conveying the motorcycle with both the wheels placed on the second conveyor, and further including angle correcting means disposed between the first and second lines for directing the axis of the front wheel of the motorcycle, which is said one wheel, perpendicularly to a longitudinal direction of the motorcycle.

A yet further object of the present invention is to provide an apparatus for transferring a motorcycle, wherein said angle correcting means comprises a swingable arm and swingable rotatable bodies supported on said swingable arm and arrayed in the longitudinal direction of the motorcycle, said rotatable bodies being movable into engagement with the front wheel to angularly correct said front wheel in response to swinging movement of said swingable arm.

A yet still further object of the present invention is to provide an apparatus for transferring a motorcycle, further comprising a movable base reciprocally movable between the first and second lines, and distance varying means for varying the distance between said movable base and said wheel gripping mechanism, and wherein said wheel gripping mechanism and said movable base are coupled to each other through said distance varying means for movement toward and away from each other in a longitudinal direction of the motorcycle.

Another object of the present invention is to provide an apparatus for transferring a motorcycle, wherein said distance varying means comprises a cylinder having a piston rod, said cylinder having an end coupled to said movable base and said piston rod having an end coupled to said wheel gripping mechanism.

Still another object of the present invention is to provide an apparatus for transferring a motorcycle, wherein said wheel gripping mechanism has wheel lifting/lowering means for placing thereon and lifting and lowering said one wheel, and clamping means for pressing and holding said one wheel.

Yet another object of the present invention is to provide an apparatus for transferring a motorcycle, further comprising a frame movable back and forth in a longitudinal direction of the motorcycle, and a vertically movable base mounted on said frame, and wherein said wheel lifting/lowering means and said clamping means are mounted on said vertically movable base, the arrangement being such that said vertically movable base is lifted by a first actuator to place said one wheel on said wheel lifting/lowering means, and after said wheel is pressed and held by said clamping means, said vertically movable base is further lifted by a second actuator to elevate and hold said one wheel at a prescribed height.

Yet still another object of the present invention is to provide an apparatus for transferring a motorcycle, wherein said wheel lifting/lowering means includes a single plated and a pair of rods mounted on said single plate and insertable below said one wheel, said single plate being displaceable in a diametrical direction of said one wheel under the resiliency of a resilient member.

A further object of the present invention is to provide an apparatus for transferring a motorcycle, wherein said clamping means includes a pair of presser plates, at least one of said presser plates being displaceable by an actuator for causing said presser plates to press and hold opposite side walls of said one wheel therebetween.

A yet further object of the present invention is to provide an apparatus for transferring a motorcycle, wherein said presser plates are operatively coupled to said actuator through link means, said one of the presser plates is displaceable by said actuator toward and away from one of the side walls of said one wheel, and the other presser plate is displaceable by said actuator from a position held against the other side wall of said one wheel to a predetermined position and then angularly movable from said predetermined position, while being guided by guide groove means and rotatable bodies movably fitted therein.

A yet still further object of the present invention is to provide an apparatus for transferring a motorcycle, wherein said actuator comprises a cylinder, and further comprising a rotary plate angularly movable by said cylinder, said one presser plate being operatively coupled to said rotary plate by a pin and said other presser plate being operatively coupled to said rotary plate by said link means, said guide groove means comprising a straight guide groove and a shaped guide groove including a straight portion and an arcuate portion, the arrangement being such that said one presser plate is displaceable along said straight guide groove by said rotary plate which is angularly moved by said cylinder, and said other presser plate is displaceable and angularly movable along said shaped guide groove by said rotary plate which is angularly moved by said cylinder.

It is also an object of the present invention to provide an apparatus for transferring a motorcycle, wherein said link means comprises a link, said link being displaced off a position where said other presser plate starts being angularly displaced, toward said one wheel, the arrangement being such that when said other presser plate is displaced away from said one wheel by said rotary plate, said other presser plate is pressed toward the arcuate portion of said shaped guide groove through said link.

Another object of the present invention is to provide an apparatus for transferring a motorcycle, further comprising a support member which is movable at least vertically, said wheel transfer base being mounted on said support member for movement along said first line, a movable base for reciprocally moving said wheel gripping mechanism between said first and second lines, and coupling means on said movable base and said wheel transfer base for coupling them to each other, the arrangement being such that when said support member is lifted to place the other wheel on said wheel transfer base, said movable base and said wheel transfer base are coupled to each other by said coupling means, and said wheel gripping mechanism and said wheel transfer base are moved in synchronism to a predetermined position by said movable base.

Still another object of the present invention is to provide an apparatus for transferring a motorcycle, wherein said coupling means comprises a rod mounted on said movable base, an engaging member angularly movably supported on said wheel transfer base for engaging said rod, and a dog member for engaging said engaging member to angularly move the engaging member to release said rod from the engaging member.

A further object of the present invention is to provide an apparatus for transferring a motorcycle, wherein said wheel transfer base has a stopper member, said engaging member being normally urged to engage said stopper member by a resilient member, said engaging member having an opening and an engaging pin, said dog member having an opening for receiving said engaging pin therein, the arrangement being such that said movable base and said wheel transfer base are movable together with said rod fitted in said opening of said engaging member, and when said dog member engages said engaging member to angularly move said engaging member, said engaging pin of said engaging member is fitted in said opening of said dog member to position said engaging member in a predetermined angular position.

A still further object of the present invention is to provide an apparatus for transferring a motorcycle, further comprising a fixed wheel receiving base mounted on said support member for rolling said other wheel from said wheel transfer base over the fixed wheel receiving base onto said second line.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a perspective view of the transfer apparatus;

DETAILED DESCRIPTION OF THE PREFERRED EMBODIMENT

Figure 1:
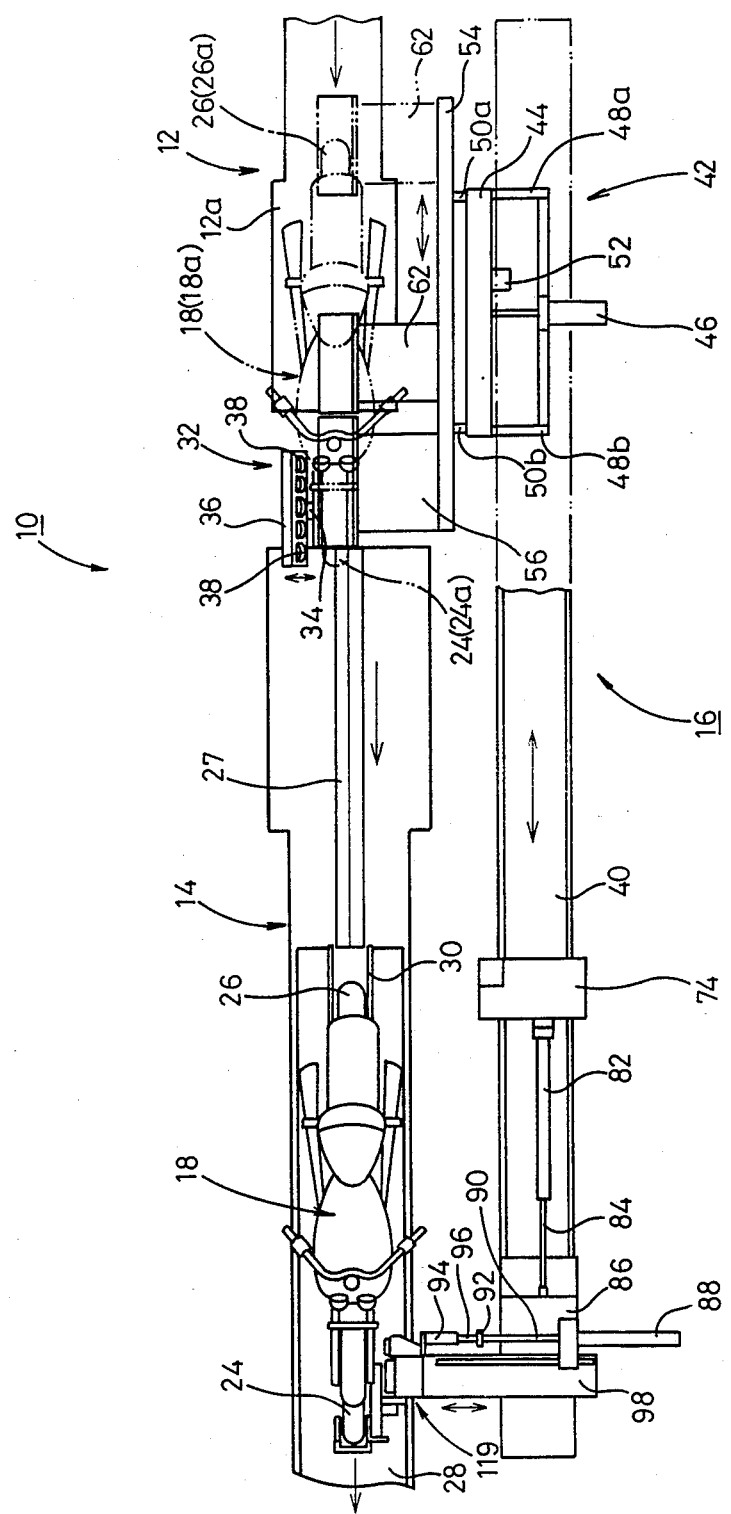
FIG. 1 is a plan view of a production line incorporating therein a transfer apparatus for carrying out a method of transferring a motorcycle according to the present invention.
Figure 2:
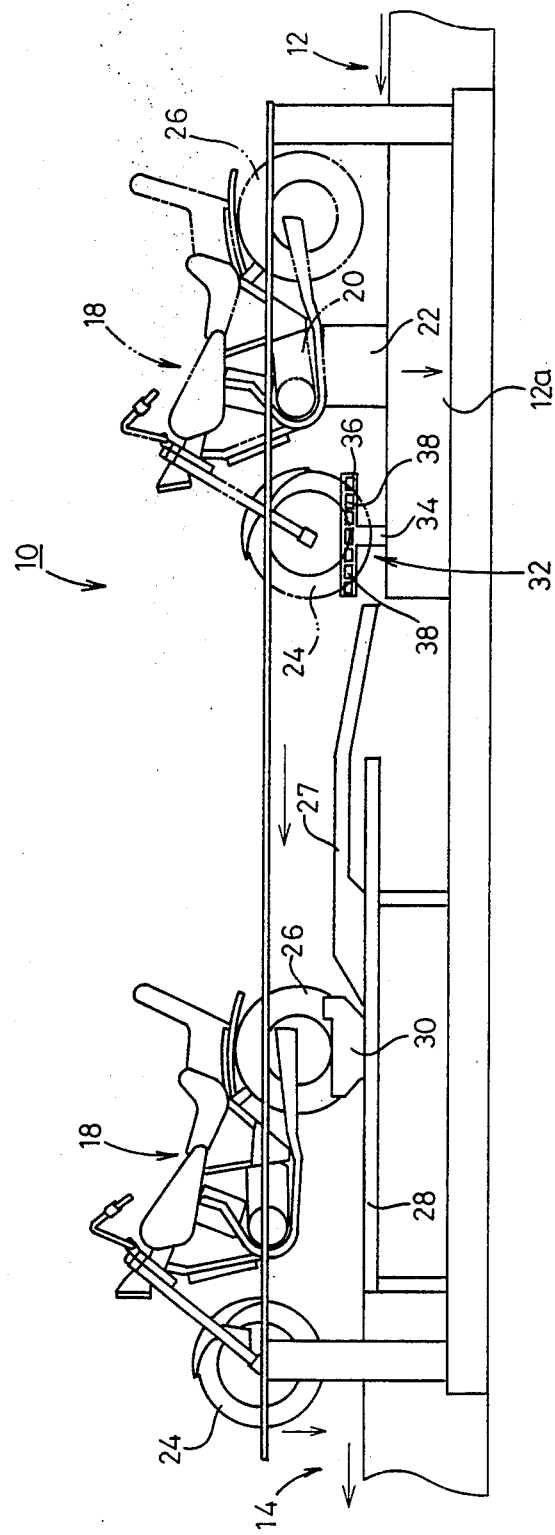
FIG. 2 is a side elevational view of the production line shown in FIG. 1.

FIG. 1 shows a production or assembly line 10 including a first line 12 and a second line 14. A transfer apparatus 16 according to the present invention is disposed alongside of the first and second lines 12, 14. As shown in FIG. 2, the first line 12 has a movable base 22 for placing an engine 20 of a motorcycle 18. The movable base 22 is lowered at a lowering station 12a at the beginning end of the second line 14 and movable back along the first line 12 so that the movable base 22 makes circulatory motion to carry successive engines 20 along the first line 12. Various components such as a front wheel 24 and a rear wheel 26 are installed on the motorcycle 18 while it is being conveyed along the first line 12.

A relatively long rear wheel transfer path 27 having a V-shaped cross section has one end spaced a given distance from the lowering station 12a of the first line 12, the other end of the rear wheel transfer path 27 being positioned near the second line 14. The second line 14 has a conveyor 28 including a clamp means 30 for firmly gripping the rear wheel 26. The motorcycle 18 with the rear wheel 26 gripped by the clamp means 30 is conveyed along the second line 14, during which time components such as a muffler, a cowling, etc. are installed on the motorcycle 18.

A front wheel angle correcting means 32 is disposed between the lowering station 12a of the first line 12 and the transfer path 27. The angle correcting means 32 includes an arm 34 swingable in a vertical direction by an actuator (not shown). A horizontal bar 36 is attached to the upper end of the arm 36, with a plurality of rotatable bodies or rollers 38 supported on the bar 36 and arrayed in the longitudinal direction of the motorcycle 18.

The transfer apparatus 16 has a support base 40 (FIG. 1) extending parallel to the first and second lines 12, 14 from one end of the first line 12 to a certain position on the conveyor 28 of the second line 14. A rear wheel support mechanism 42 is disposed in the support base 40 and extends toward the first line 12.

The rear wheel support mechanism 42 includes a mount 44 disposed in the support base 40 and movable toward and away from the first line 12 by a cylinder 46 while being guided by guide rails 48a, 48b.

As illustrated in FIG. 3, a pair of guide rails 50a, 50b is vertically attached to the surface of the mount 44 which faces the first line 12. A support member 54 is vertically movably held in engagement with the guide rails 50a, 50b, the support member 54 being vertically movable by a cylinder 52.

The support member 54 extends along the first line 12. A rear wheel receiving base 56 is fixed to one end of the support member 54 which confronts the angle correcting means 32. A guide plate 58 having a V-shaped cross section is attached to the rear wheel receiving base 56 and disposed between the first line 12 and the transfer path 27. A pair of vertically spaced parallel rails 60a, 60b is attached to a vertical surface of the support member 54. A rear wheel transfer base 62 is movably supported on the rails 60a, 60b. To the rear wheel transfer base 62, there is fixed a support plate 62a having a V-shaped cross section. An engaging member 63 serving as a coupling means is rotatably mounted on an upper portion of the rear wheel transfer base 62.

Figure 4B:
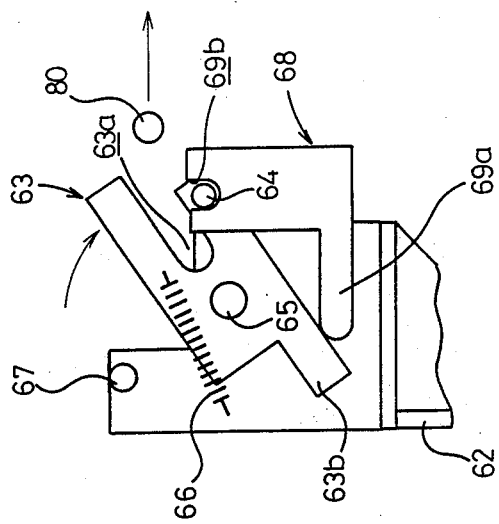
FIGS. 4(a) and 4(b) are enlarged views of coupling means of a wheel transfer base of the transfer apparatus.
Figure 4A:
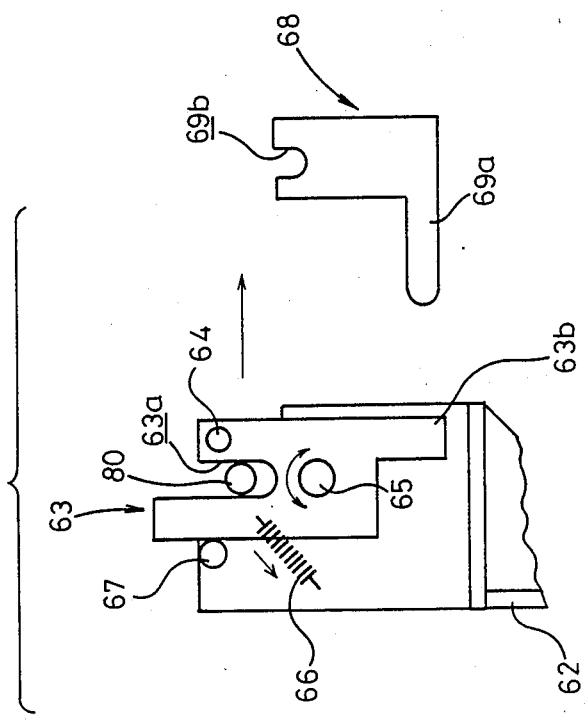

As shown in FIG. 4(a), the engaging member 63 has an oblong opening 63a defined vertically therein and having an open upper end, and a projection 63b integrally extending downwardly from a lower portion of the engaging member 63. An engaging pin 64 is mounted on the engaging member 63 near the opening 63a. The engaging member 63 is angularly movably supported at its substantially central area on the rear wheel transfer base 62 by means of a pin 65. A resilient member 66 such as a coil spring acts between the engaging member 63 and the rear wheel transfer base 62, which has a stopper pin 67 for engaging the engaging member 63. The engaging member 63 is normally urged into engagement with the stopper pin 67 under the resiliency of the resilient member 66, as shown in FIG. 4(a).

A dog member 68 is mounted on the rail 60a in the vicinity of the rear wheel receiving base 56 (FIG. 3). The dog member 68 has a dog 69a on its lower end for engaging the projection 63b of the engaging member 63 and a vertically extending oblong hole 69b in its upper end for receiving the engaging pin 64 therein, as shown in FIG. 4(a).

As shown in FIG. 3, a pair of guide rails 70a, 70b extending along the first and second lines 12, 14 is mounted on an upper surface of the support base 40. A rack 72 extending parallel to the guide rail 70a is also mounted on the upper surface of the support base 40 near the guide rail 70a. A movable base 74 is movably held in engagement with the guide rails 70a, 70b and supports thereon a rotative drive source 76 having a rotatable drive shaft 76a on which a pinion 78 is mounted in mesh with the rack 72. A rod 80 projects horizontally from the movable base 74 toward the first line 12 and is positioned downwardly of the movable base 74. The rod 80 can be fitted into the opening 63a of the engaging member 63 on the rear wheel transfer base 62.

A relatively long cylinder 82 parallel to the guide rails 70a, 70b is coupled to the movable base 74 and has a piston rod 84 connected to a movable frame 86. The cylinder 82 thus serves as a distance varying means for adjusting the distance between the movable base 74 and the movable frame 86.

Another cylinder 88 is fixed to the movable frame 86 and has its longitudinal axis directed perpendicularly to the cylinder 82. The cylinder 88 has a piston rod 90 coupled to a piston rod 96 of a cylinder 94 through a joint 92, the cylinder 94 being fixed to a slidable frame 98.

The slidable frame 98 has an end projecting toward the assembly line 10, and a pair of guide members 100a, 100b which confront each other and extend vertically is fixedly mounted on the projecting end of the slidable frame 98. A longer first lifting/lowering cylinder 102 is held on the guide member 100a and has a downwardly extending piston rod 104 with an engaging member 106 mounted on its lower end. A shorter second lifting/lowering cylinder 108 is fixed to the end of the slidable frame 98 near the guide member 102b and has an upwardly extending piston rod 110.

A vertically movable base 112 is held on the slidable frame 98 through the lifting/lowering cylinders 102, 108. The vertically movable base 112 has vertical rails 114a, 114b on its opposite sides which engage the guide members 100a, 100b, respectively. A holder member 116 is attached to the upper end of the vertically movable base 112 and coupled to the piston rod 110 of the second lifting/lowering cylinder 108. A support body 118 in which the piston 104 of the first lifting/lowering cylinder 102 is slidably fitted is mounted on a lower portion of the vertically movable base 112. A front wheel lifting/lowering means 120 of a wheel gripping mechanism 119 is mounted on the lower portion of the vertically movable base 112.

Figure 6:
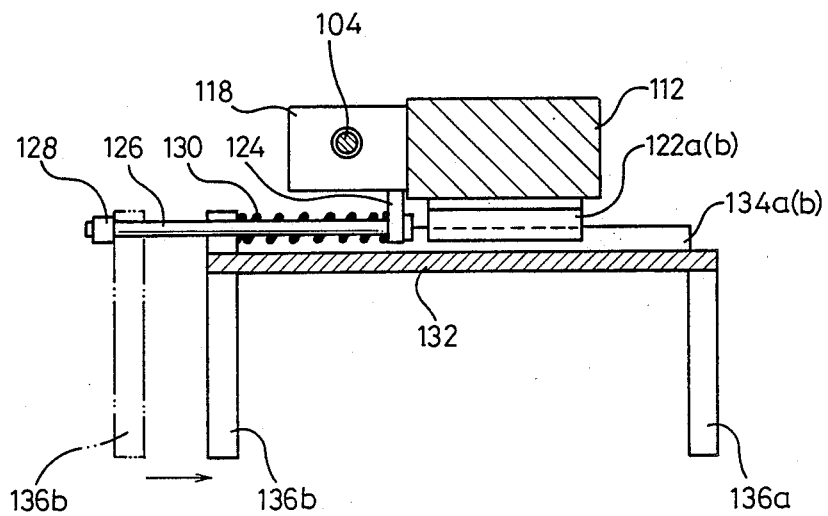
FIG. 6 is a cross-sectional view taken along line VI—VI of FIG. 5.

As shown in FIG. 6, the front wheel lifting/lowering means 120 includes a pair of upper and lower horizontal guide members 122a, 122b fixed to the lower portion of the vertically movable base 112, and a fixed plate 124 is secured to the vertically movable base 112 near the guide members 122a, 122b. A guide bar 126 has one end threaded in the fixed plate 124, and a stopper nut 128 is threaded on the other end of the guide bar 126. A coil spring 130 is disposed around the guide bar 126. A horizontally displaceable plate 132 has on one side thereof a pair of rails 134a, 134b slidably engaging the guide members 122a, 122b, respectively, and on the other side a pair of rods 136a, 136b spaced horizontally from each other and projecting away from the rails 134a, 134b. The guide bar 126 is slidably fitted in one end of the plate 132, and the coil spring 130 is disposed between said one end of the plate 132 and the fixed plate 124 for normally urging the plate 132 toward the stopper nut 128.

Figure 5:
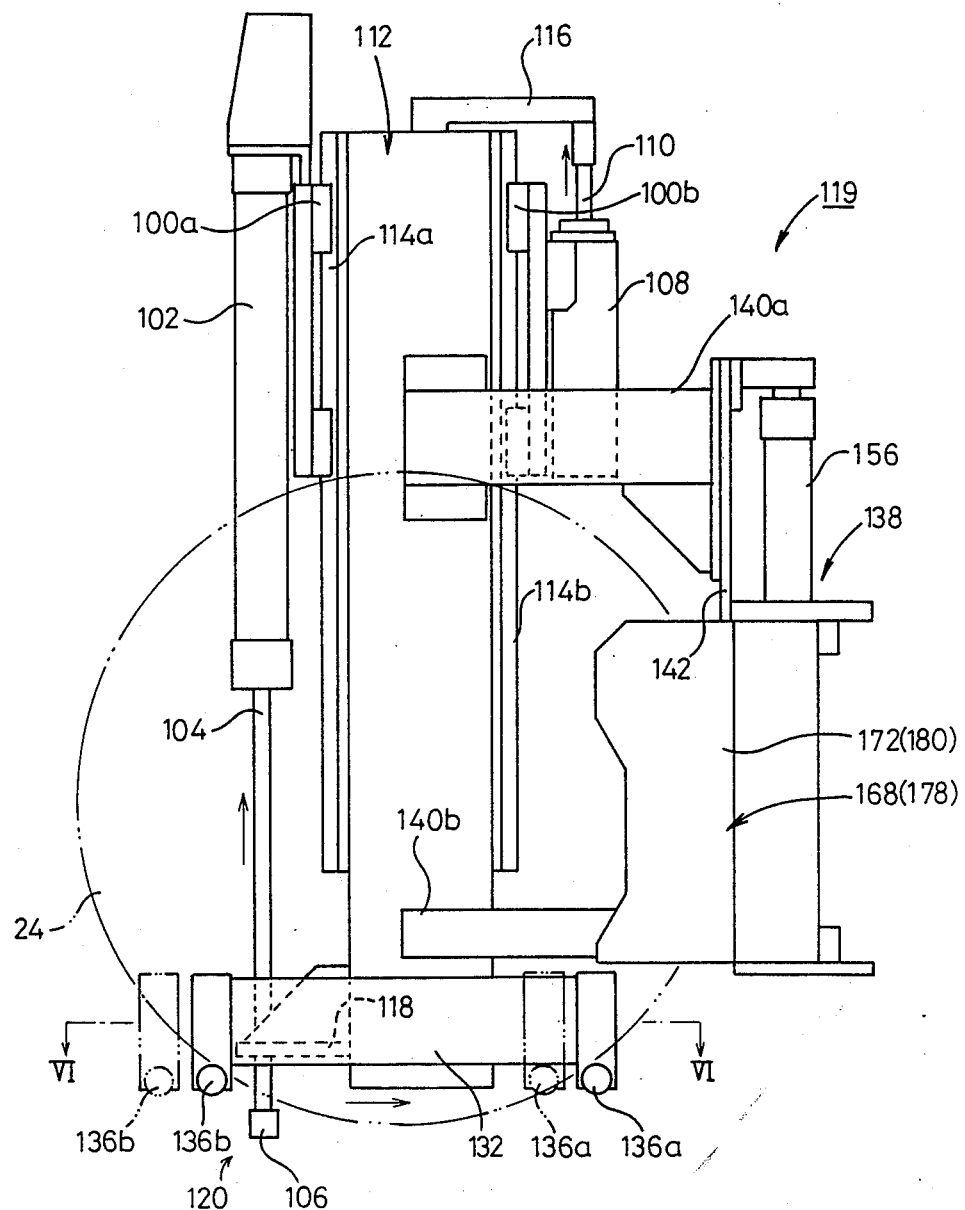
FIG. 5 is a front elevational view of a wheel gripping mechanism of the transfer apparatus.
Figure 7:
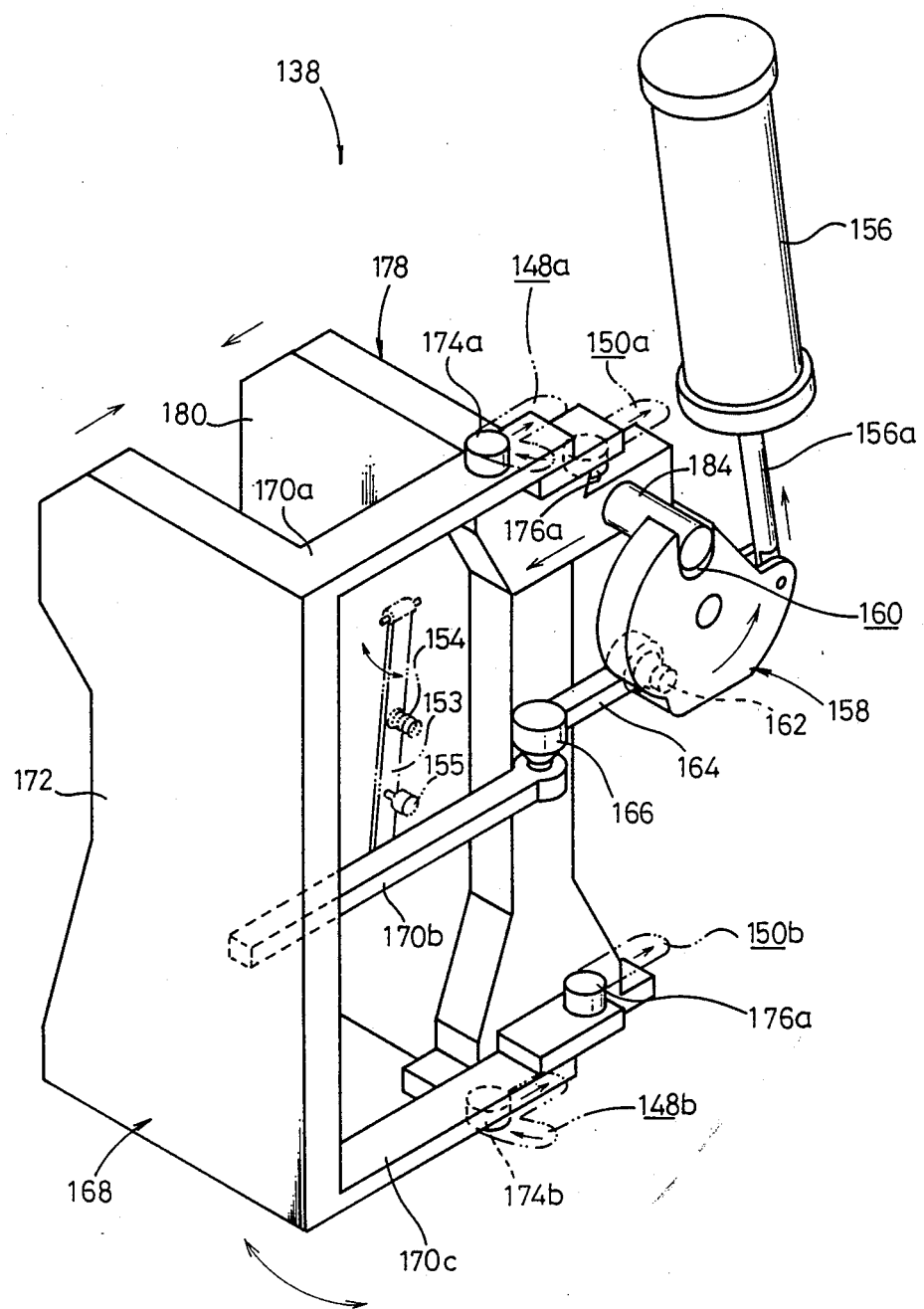
FIG. 7 is a perspective view of a clamping means of the transfer apparatus.
Figure 8:
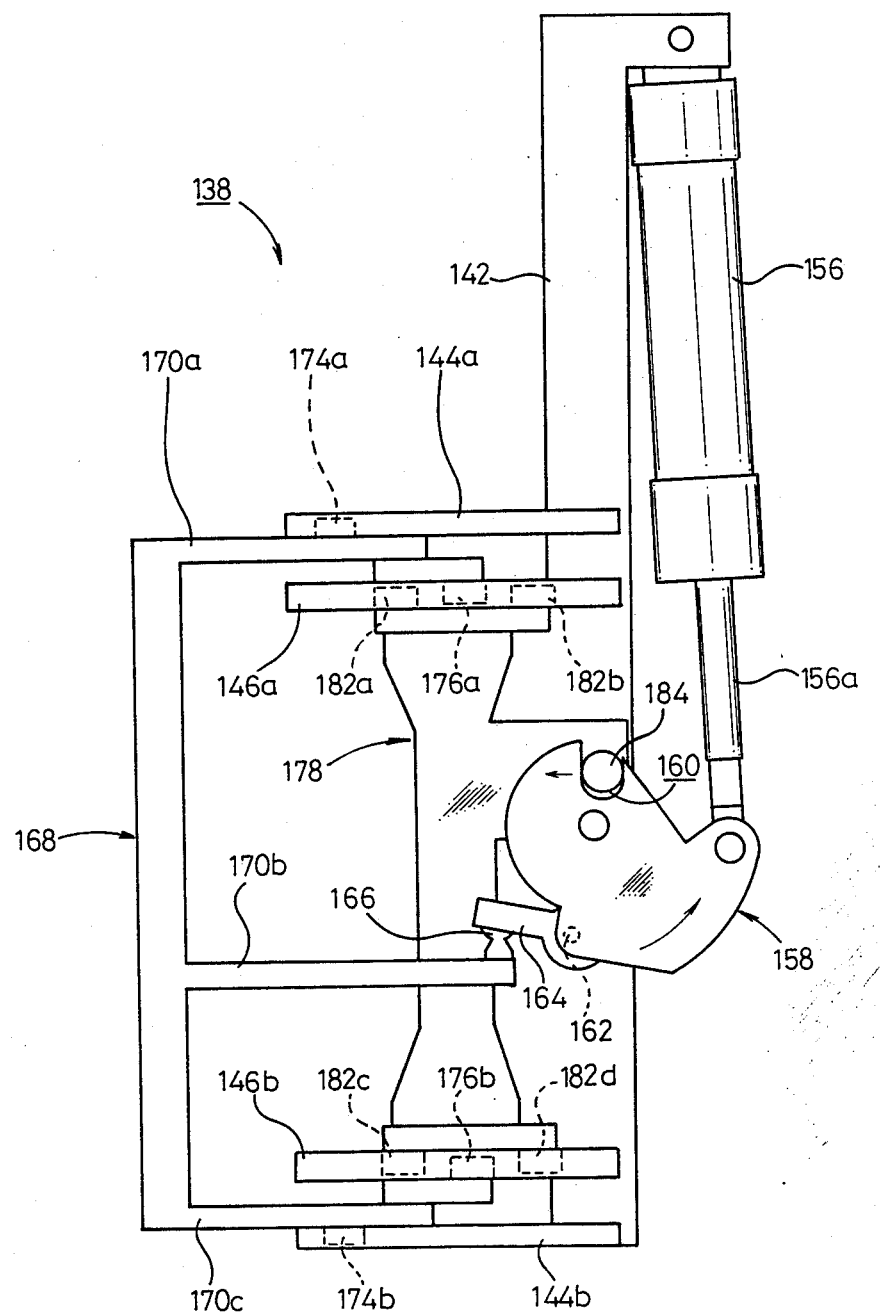
FIG. 8 is a side elevational view of the clamping means.
Figure 9:
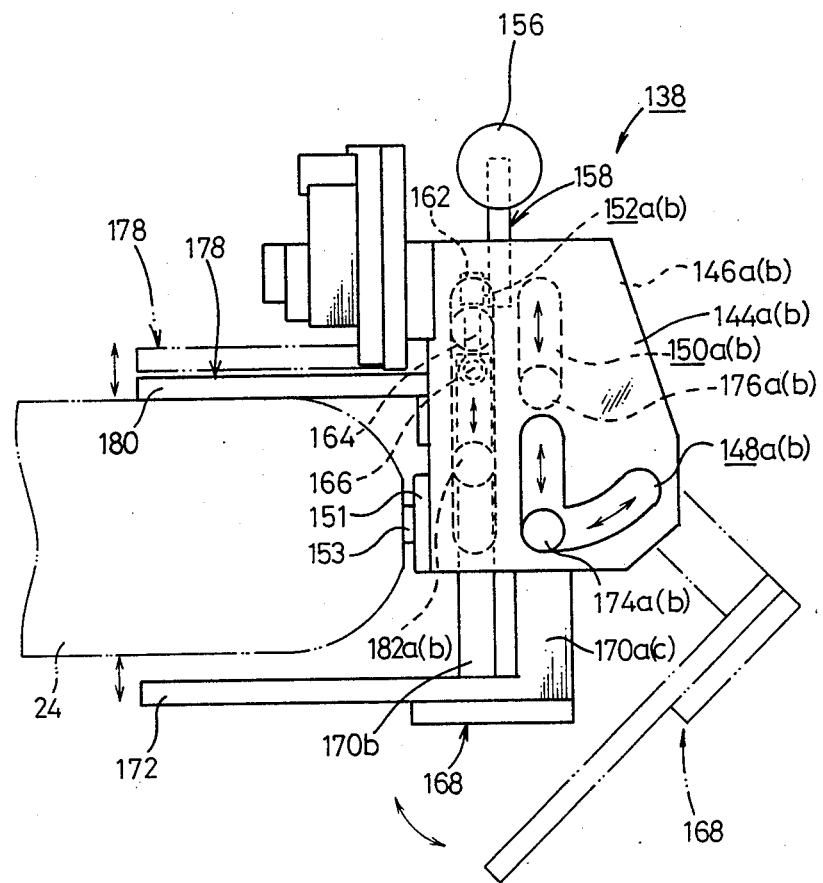
FIG. 9 is a plan view of the clamping means.

The wheel gripping mechanism 119 also includes a front wheel clamping means 138 mounted on the vertically movable base 112. As illustrated in FIG. 5, the front wheel clamping means 138 includes a pair of vertically spaced fixed arms 140a, 140b secured to the vertically movable base 112 with a bracket 142 extending between and coupled to the arms 140a, 140b. A pair of first parallel cam plates 144a, 144b (FIG. 8) spaced vertically from each other is fixed to the bracket 142, and another pair of second parallel cam plates 146a, 146b spaced vertically from each other is fixed to the bracket 142 between the first cam plates 144a, 144b. As illustrated in FIGS. 7 through 9, the first cam plates 144a, 144b have guide grooves 148a, 148b defined respectively therein, each including a straight portion extending perpendicularly to the assembly line 10 and a curved or arcuate portion bent from the straight portion away from the assembly line 10. The second cam plates 146a, 146b have respective guide grooves 150a, 150b defined therein in line with the straight portions of the guide grooves 148a, 148b and extending a prescribed length in a direction normal to the assembly line 10. The second cam plates 146a, 146b also have respective guide grooves 152a, 152b defined therein and extending parallel to and longer than the guide grooves 150a, 150b.

A vertically extending support plate 151 (FIGS. 3 and 9) is integrally joined to the first cam plates 144a, 144b and the second cam plates 146a, 146b. A touch plate 153 serving as a front wheel detecting means is disposed on the support plate 151. The touch plate 153 has an upper portion swingably supported on the support plate 151 and a lower portion normally urged to move away from the support plate 151 under the resiliency of a resilient member 154 (FIG. 7). A detector 155 such as a limit switch is mounted on the support plate 151 near the lower portion of the touch plate 153. The detector 155 is not actuated by the lower portion of the touch plate 153 unless external forces are applied to the touch plate 153 to move the latter toward the support plate 151.

A cylinder 156 is swingably supported on the fixed arm 140a and has a downwardly extending piston rod 156a connected to one end of a rotary plate 158 having a curved shape (see FIGS. 7 and 8). The rotary plate 158 is rotatably supported on the bracket 142 and has an oblong hole 160 with its outer end opening at an outer peripheral edge of the rotary plate 158. A link 164 has one end engaging an outer peripheral edge of the rotary plate 158 diametrically opposite to the oblong hole 160 through a spherical bearing 162. The other end of the link 164 engages a first gripping member 168 through a spherical bearing 166.

More specifically, the first gripping member 168 includes first, second, and third movable arms 170a, 170b, 170c and a vertically elongate presser plate 172 fixed to ends of the movable arms 170a through 170c. The first and third movable arms 170a, 170b support rotatable bodies or rollers 174a, 174b respectively thereon which are movably fitted in the guide grooves 148a, 148b in the first cam plates 144a, 144b, and also support rotatable bodies or rollers 176a, 176b respectively thereon which are movably fitted in the guide grooves 150a, 150b in the second cam plates 146a, 146b. The second movable arm 170b has the spherical bearing 166 thereon and engages the link 164 at a position which is displaced off the centers of the rollers 176a, 176b toward the front wheel 24 (see FIG. 9).

A second gripping member 178 is supported by the second cam plates 146a, 146b. The second gripping member 178 has a presser plate 180 for coacting with the presser plate 172 in confronting relation thereto.

Rotatable bodies or rollers 182a, 182b and 182c, 182d are rotatably supported on vertically opposite ends of the second gripping member 178 and movably fitted in the guide grooves 152a, 152b in the second cam plates 146a, 146b. A pin 184 is mounted on the second gripping member 148 and projects therefrom in a direction normal to the guide grooves 152a, 152b. The pin 184 is fitted in the oblong hole 160 in the rotary plate 158.

The transfer apparatus 16 according to the present invention is basically constructed as described above. Operation and advantages of the transfer apparatus 16 will now be described in detail below.

The movable base 22 with the engine 20 placed thereon is moved along the first line 12 toward the second line 14 while various components such as the front wheel 24, the rear wheel 26, etc. are being installed on the motorcycle 18. When the movable base 22 reaches the lowering station 12a at the end of the first line 12, the movable base 22 is brought to a stop. At this time, as shown in FIG. 2, the front and rear wheels 24, 26 are lifted off the conveyor of the first line 12. The angle correcting means 32 is operated to swing the arm 34 upwardly. The rollers 38 supported on the bar 36 are moved into contact with a side wall of the front wheel 24 and orients the front wheel 24 in the longitudinal direction of the motorcycle 18, thus angularly adjusting the front wheel 24 to direct the axis of the front wheel 24 perpendicularly to the longitudinal direction of the motorcycle 18.

The cylinder 46 of the rear wheel support mechanism 42 is actuated to move the mount 44 toward the first line 12, and then the cylinder 52 is operated to elevate the support member 54. The rear wheel receiving base 56 and the rear wheel transfer base 62 are lifted until the rear wheel 26 of the motorcycle 18 is placed on the rear wheel transfer base 62 and the rod 80 of the movable base 74 is fitted into the opening 63a in the engaging member 63 of the coupling means.

Then, the cylinder 88 on the movable frame 86 is operated to displace the slidable frame 98 toward the first line 12, after which the cylinder 94 is actuated to cause the slidable frame 98 to insert the rods 136a, 136b fixed to the plate 132 below the front wheel 24. The cylinder 82 then actuated to move the movable frame 86 toward the movable base 74 for bringing the touch plate 153 on the support plate 151 of the front wheel clamping means 138 into engagement with the front wheel 24. The touch plate 153 is now forced to swing toward the support plate 151 against the resilient forces of the resilient member 154 until the detector 155 is turned on, whereupon the cylinder 82 is inactivated. The front wheel clamping means 138 is thereby positioned with respect to the front wheel 24.

The second lifting/lowering cylinder 108 is operated to displace the piston rod 110 upwardly to enable the holder member 116 coupled to the piston rod 110 to lift the vertically movable base 112. The rods 136a, 136b are therefore moved upwardly while supporting the front wheel 24. The operation of the second lifting/lowering cylinder 108 is stopped when a weight sensor (not shown) for detecting the weight of the front wheel 24 and associated parts is turned on. At this time, the plate 132 on which the rods 136a, 136b are mounted is pressed toward the stopper nut 128. Upon the upward movement of the plate 132, the front wheel 24 first abuts against the rod 136a. The front wheel 24 is then turned to displace the plate 132 in the direction of the arrow (FIG. 5) against the bias of the coil spring 130, whereby the rods 136a, 136b are shifted to a position in which they are equidistantly spaced from the center of the front wheel 24 (i.e., from the two-dot-and-dash-line position to the solid-line position in FIG. 5).

The cylinder 156 of the front wheel clamping means 138 is then operated to move the piston rod 156a upwardly thus rotating the rotary plate 158 counterclockwise in the direction of the arrow in FIG. 7. The first gripping member 168 operatively coupled to the rotary plate 158 through the spherical bearing 162, the link 164, and the spherical bearing 166 is therefore angularly displaced.

More specifically, with the rollers 176a, 176b on the first and third movable arms 170a, 170c being positioned at one end of the guide grooves 150a, 150b in the second cam plates 146a, 146b, the rollers 174a, 174b are moved along the curved portions of the guide grooves 148a, 148b, respectively, in the first cam plates 144a, 144b. The first gripping member 168 is angularly displaced about the rollers 176a, 176b to bring the presser plate 172 of the first gripping member 168 into confronting relation to one side wall of the front wheel 24 (see FIG. 9).

Continued angular movement of the rotary plate 158 in the direction of the arrow effected by the cylinder 156 displaces the rollers 174a, 174b along the straight portions of the guide grooves 148a, 148b and also displaces the rollers 176a, 176b along the guide grooves 150a, 150b. The first gripping member 168 is displaced rectilinearly to press the presser plate 172 against the side wall of the front wheel 24.

When the rotary plate 158 is angularly displaced in the direction of the arrow, the pin 184 fitted in the oblong hole 160 in the rotary plate 158 is displaced in the direction of the arrow to the left in FIG. 7. Therefore, the second gripping member 178 on which the pin 184 is mounted is displaced by being guided by the rollers 182a through 182d and the guide grooves 152a, 152b to press the presser plate 180 against the other side wall of the front wheel 24.

As described above, after the presser plate 172 of the first gripping member 168 has been angularly displaced a large interval in an area spaced from the front wheel 24, the presser plate 172 is moved toward and parallel to one side wall of the front wheel 24, and at the same time the presser plate 180 of the second gripping member 178 is moved toward and parallel to the other side wall of the front wheel 24. Consequently, the opposite side walls of the front wheel 24 can be held by and between the presser plates 172, 180 which lie parallel to each other.

Then, the first lifting/lowering cylinder 102 is actuated to displace the piston rod 104 upwardly, moving the engaging member 106 on the lower end of the piston rod 104 into abutment against the support body 118 and lifting the support body 118. The vertically movable base 112 is thus elevated to a prescribed height while being guided by the guide members 100a, 100b and the rails 114a, 114b. A lower portion of the front wheel 24 is now supported on the front wheel lifting/lowering means 120 and lifted with the opposite sides walls gripped by the clamping means 138. The motorcycle 18 is lifted except the rear wheel 26 placed on the rear wheel transfer base 62. When the front wheel 24 has reached a predetermined height, the first lifting/lowering cylinder 102 is inactivated, and the movable base 22 carrying the engine 20 is lowered.

The rotative drive source 76 on the movable base 74 is actuated to rotate the pinion 78 on the drive shaft 76a, moving the movable base 74 from the first line 12 toward the second line 14 through the rack 72. The movable frame 86 is coupled to the movable base 74 through the piston rod 84 of the cylinder 82, and the rod 80 projecting from the movable base 74 is fitted in the opening 63a in the engaging member 63 on the rear wheel receiving base 62. Consequently, the movable frame 86 and the rear wheel transfer base 62 are moved in unison or synchronism with each other through the movable base 74. When the motorcycle 18 with its front wheel 24 gripped by the front wheel gripping mechanism 119 is moved, the rear wheel 26 is not disengaged from the support plate 62a of the rear wheel transfer base 62.

The rear wheel transfer base 62 is guided toward the rear wheel receiving base 56 by the rails 60a, 60b. When the rear wheel transfer base 62 reaches a predetermined position, the projection 63b of the engaging member 63 of the coupling means engages the dog 69a as shown in FIG. 4(a). The engaging member 63 is turned clockwise about the pin 65 against the bias of the resilient member 66 until the engaging pin 64 is fitted into the opening 69b to position the engaging member 63 in a certain angular position and release the rod 80 from the opening 63a. The rear wheel transfer base 62 now comes to a stop, and the rear wheel 26 of the motorcycle 18 which is being moved toward the second line 14 by the movable base 74 is transferred from the rear wheel transfer base 62 onto the rear wheel receiving base 56. The rear wheel 26 continuously rolls onto the transfer path 27 and then the conveyor 28 of the second line 14. The operation of the rotative drive source 76 is turned off when the rear wheel 26 arrives at a predetermined position on the clamping means 30 on the conveyor 28.

The clamping means 30 is then operated to firmly clamp the rear wheel 26, after which the first lifting/lowering cylinder 102 is actuated to displace the piston rod 104 downwardly. The vertically movable base 112 is lowered with the piston rod 104, placing the front wheel 24 supported on the clamping means 138 and the rods 136a, 136b onto the conveyor 28. The clamping means 138 is then operated to release the front wheel 24 therefrom.

More specifically, the cylinder 156 is operated to displace the piston rod 156a downwardly. The rotary plate 158 is turned clockwise in the direction opposite to the direction of the arrow in FIG. 7 to displace the rollers 174a, 174b, 176a, 176b on the first gripping member 168 along the guide grooves 148a, 148b, 150a, 150b, thereby moving the presser plate 172 away from one side wall of the front wheel 24 parallel thereto. Upon further clockwise rotation of the rotary plate 158, the rollers 176a, 176b are stopped at the ends of the guide grooves 150a, 150b, and the rollers 174a, 174b are angularly displaced along the curved portions of the guide grooves 148a, 148b. Therefore, the presser plate 172 is largely angularly displaced in a direction away from the front wheel 24 about the rollers 176a, 176b.

The link 164 coupled to the rotary plate 158 through the spherical bearing 162 is held in engagement with the second movable arm 170b in a position which is displaced off the centers of the rollers 176a, 176b toward the vertically movable base 112 (i.e., toward the front wheel 24). The counterclockwise rotation of the rotary plate 158 therefore causes the link 164 and the second movable arm 170b to displace the first gripping member 168 away from the front wheel 24. The rollers 174a, 174b can easily enter the curved portions of the guide grooves 148a, 148b, respectively, for reliably permitting the angular movement of the presser plate 172.

When the rotary plate 158 is turned counterclockwise as described above, the second gripping member 178 is moved away from the first gripping member 168, i.e., in the direction opposite to the direction of the arrow in FIG. 7, by the pin 184 fitted in the oblong hole 160. As a result, the second gripping member 178 is displaced in the direction opposite to the direction of the arrow by being guided by the rollers 182a through 182d fitted in the guide grooves 152a, 152b in the second cam plates 146a, 146b. The second gripping member 178 is moved away from the opposite side wall of the front wheel 24 parallel thereto.

After the front wheel 24 has been released from the clamping means 138, the cylinder 94 and the cylinder 88 are operated to displace the slidable frame 98 away from the second line 14 for thereby moving the rods 136a, 136b and the clamping means 138 away from the front wheel 24. At this time, since the presser plate 172 of the first gripping member 136 of the clamping means 138 has been largely angularly displaced away from the front wheel 24, the presser plate 172 does not interfere with the front wheel 24.

The rotative drive source 76 is operated to move the movable base 74 and the movable frame 86 in unison toward the first line 12. When the movable base 74 is positioned in alignment with the rear wheel transfer base 62, the engaging member 63 has been angularly positioned by engagement with the dog member 68 as shown in FIG. 4(b). The rod 80 on the movable base 74 is fitted into the opening 63a in the engaging member 63, and the engaging member 63 is pushed toward the stopper pin 67 to move the rear wheel transfer base 62 away from the rear wheel receiving base 56 until the engaging member 63 is turned into abutment against the stopper pin 67. Therefore, the movable base 74, the movable frame 86, and the rear wheel transfer base 62 are moved in unison toward the first line 12. When the movable base 74 returns to the initial position, the rotative drive source 76 is de-energized. The cylinder 52 is operated to retract the support member 54 downwardly so as to be ready for transferring a next motorcycle 18 which has been conveyed along the first line 12 to the second line 14.

The motorcycle 18 with the rear wheel 26 clamped by the clamping means 30 is conveyed along the second line 14 by the conveyor 28, during which time various other components such as a muffler, a cowling, etc. are installed on the motorcycle 18.

According to the illustrated embodiment, as described above, the front wheel 24 of the motorcycle 18 which has been conveyed along the first line 12 with the engine 20 placed on the movable base 22 is angularly positioned or adjusted by the angle correcting means 32. Then, the front wheel 24 is held and lifted to a certain height by the rods 136a, 136b and the clamping means 138, leaving only the rear wheel 26 supported on the rear wheel transfer base 62. The movable base 74 is propelled to transfer the front wheel 24 toward the second line 14, while allowing the rear wheel 26 to roll from the rear wheel transfer base 62 over the rear wheel receiving base 56 and the transfer path 27 onto the conveyor 28 of the second line 14. After the rear wheel 26 has been held by the clamping means 30, the front wheel 24 is lowered, and the motorcycle 18 is transferred onto the second line 14.

The motorcycle 18 can be transferred highly efficiently and reliably from the first line 12 to the second line 14 simply by gripping the front wheel 24 of the motorcycle 18. The mental and physical strain on the worker and any possible damage to the motorcycle 18 are reduced as compared to the motorcycle 18 being suspended from a hoist crane or the like by the worker. The process of transferring the motorcycle 18 from the first line 12 to the second line 14 can be automatized, and the efficiency of the assembly line 10 is increased.

The transfer apparatus 16 is capable of easily transferring various motorcycles of different types or designs.

More specifically, for transferring a motorcycle 18a larger than the motorcycle 18 from the first line 12 to the second line 14, the rear wheel transfer base 26 is positioned beforehand in confronting relation to the rear wheel 26a of the motorcycle 18a. Then, after the motorcycle 18a has been conveyed into the lowering station 12a and when operating the wheel gripping mechanism 119, the front wheel clamping means 138 is positioned by being displaced longitudinally of the motorcycle 18a. Therefore, the front wheel 24a of the motorcycle 18a larger than the motorcycle 18 can reliably be held by the front wheel clamping means 132.

With the present invention, as described above, for transferring a motorcycle being assembled from the first line to the second line, the front wheel of the motorcycle is first gripped and lifted to leave only the rear wheel supported on the transfer path, and then the front wheel is transferred onto the second line while allowing the rear wheel to roll over the transfer path onto the second line. Thereafter, the front wheel is lowered to place the motorcycle on the second line. Since the motorcycle is transferred onto the second line simply by lifting and transferring the front wheel, the motorcycle can be transferred onto the second line reliably within a short period of time. The transfer process can automatically be carried out. Any strain on the worker during the transfer process is rendered lower and the efficiency of the transfer process is rendered higher than would be if the motorcycle were transferred by the worker. Inasmuch as the wheel gripping mechanism for gripping the front wheel is displaceable longitudinally with respect to the motorcycle, the transfer apparatus can easily transfer a variety of motorcycles of different kinds. The transfer apparatus lends itself to the production of motorcycles of many different types each in a small quantity.

Although a certain preferred embodiment has been shown and described, it should be understood that many changes and modifications may be made therein without departing from the scope of the appended claims.

What is claimed is:

1. A method of transferring a motorcycle being assembled from a first conveyor line to a second conveyor line, comprising the steps of:
   gripping a first wheel of the motorcycle with a wheel gripping mechanism;
   lifting the gripped wheel such that only a second wheel of the motorcycle is supported on a transfer path;
   moving said wheel gripping mechanism toward the second conveyor line to roll said second wheel over said transfer path onto the second conveyor line;
   lowering said first wheel onto the second conveyor line; and
   releasing said first wheel from said wheel gripping mechanism.

2. A method according to claim 1, wherein said first wheel comprises a front wheel of said motorcycle and said second wheel comprises a rear wheel of said motorcycle, and wherein said first conveyor line has a first conveyor means for conveying the motorcycle with said first and second wheels being supported above said first conveyor line, and said second conveyor line has a second conveyor means for conveying the motorcycle with said first and second wheels placed on the second conveyor means, further comprising the steps of:
   gripping said front wheel by said wheel gripping mechanism;
   lifting said front wheel so as to place said rear wheel on a rear wheel transfer base;
   moving said gripping mechanism and said rear wheel transfer base in synchronism toward said second conveyor line;
   stopping only said rear wheel transfer base at a prescribed position so as to roll said rear wheel over said rear wheel transfer base onto said second conveyor line;
   clamping said rear wheel on said second conveyor line; and thereafter
   lowering said front wheel onto said second conveyor line; and
   releasing said front wheel from said wheel gripping mechanism.

3. A method according to claim 2, further comprising the step of:
   angularly adjusting said front wheel so that the axis of the front wheel is aligned perpendicularly to a longitudinal direction of said motorcycle, when said front wheel is placed on said first conveyor means so as to be gripped by said gripping mechanism.

4. A method according to claim 2, further comprising the step of:
   lowering said first conveyor means out of physical interference with a movement of said rear wheel transfer base, when said front wheel is to be lifted to place said rear wheel on said rear wheel transfer base.

5. An apparatus for transferring a motorcycle being assembled from a first conveyor line to a second conveyor line, comprising:
   a wheel gripping means for gripping a first wheel of the motorcycle, said wheel gripping means being reciprocally movable between the first and second conveyor lines; and
   a wheel transfer base means for placing the second wheel of the motorcycle, said wheel transfer base means being reciprocally movable between the first conveyor line and a prescribed position on the second conveyor line in synchronism with said wheel gripping means.

6. An apparatus according to claim 5, wherein said first wheel comprises a front wheel of said motorcycle, and wherein said first conveyor line has a first conveyor means for conveying the motorcycle with said first and second wheels being supported above said first conveyor means, and said second conveyor line has a second conveyor means for conveying the motorcycle with said first and second wheels placed on the second conveyor means, and further including angle correcting means disposed between the first and second conveyor lines for directing the axis of the front wheel of the motorcycle perpendicularly to a longitudinal direction of the motorcycle.

7. An apparatus according to claim 6, wherein said angle correcting means comprises a swingable arm and swingable rotatable bodies supported on said swingable arm and arrayed in the longitudinal direction of the motorcycle, said rotatable bodies being movable into engagement with the front wheel to angularly correct said front wheel in response to swinging movement of said swingable arm.

8. An apparatus according to claim 5, further comprising a movable base reciprocally movable between the first and second conveyor lines, and distance varying means for varying the distance between said movable base and said wheel gripping means, and wherein said wheel gripping means and said movable base are coupled to each other through said distance varying means for movement toward and away from each other in a longitudinal direction of the motorcycle.

9. An apparatus according to claim 8, wherein said distance varying means comprises a cylinder having a piston rod, said cylinder having an end coupled to said movable base and said piston rod having an end coupled to said wheel gripping means.

10. An apparatus according to claim 5 or 8, wherein said wheel gripping means has wheel lifting/lowering means for placing thereon and lifting and lowering said first wheel, and clamping means for pressing and holding said first wheel.

11. An apparatus according to claim 10, further comprising a frame movable back and forth in a longitudinal direction of the motorcycle, and a vertically movable base mounted on said frame, and wherein said wheel lifting/lowering means and said clamping means are mounted on said vertically movable base, the arrangement being such that said vertically movable base is lifted by a first actuator to place said first wheel on said wheel lifting/lowering means, and after said first wheel is pressed and held by said clamping means, said vertically movable base is further lifted by a second actuator to elevate and hold said first wheel at a prescribed height.

12. An apparatus according to claim 10, wherein said wheel lifting/lowering means includes a single plate and a pair of rods mounted on said single plate and insertable below said first wheel, said single plate being displaceable in a direction diametrical to said first wheel under the resiliency of a resilient member.

13. An apparatus according to claim 10, wherein said clamping means includes a pair of presser plates, at least one of said presser plates being displaceable by a third actuator for causing said presser plates to press and hold opposite side walls of said first wheel therebetween.

14. An apparatus according to claim 13, wherein said presser plates are operatively coupled to said third actuator through link means, said one of the presser plates is displaceable by said third actuator toward and away from one of the side walls of said first wheel, and the other presser plate is displaceable by said third actuator from a position held against the other side wall of said first wheel to a predetermined position and then angularly movable from said predetermined position, while being guided by guide groove means and rotatable bodies movably fitted therein.

15. An apparatus according to claim 14, wherein said third actuator comprises a cylinder, and further comprising a rotary plate angularly movable by said cylinder, said one presser plate being operatively coupled to said rotary plate by a pin and said other presser plate being operatively coupled to said rotary plate by said link means, said guide groove means comprising a straight guide groove and a shaped guide groove including a straight portion and an arcuate portion, the arrangement being such that said one presser plate is displaceable along said straight guide groove by said rotary plate which is angularly moved by said cylinder, and said other presser plate is displaceable and angularly movable along said shaped guide groove by said rotary plate which is angularly moved by said cylinder.

16. An apparatus according to claim 15, wherein said link means comprises a displaceable link, said link being displaceable from a position where said other presser plate starts being angularly displaced, toward said one wheel, the arrangement being such that when said other presser plate is displaced away from said one wheel by said rotary plate, said other presser plate is pressed toward the arcuate portion of said shaped guide groove through said displaceable link.

17. An apparatus according to claim 11, wherein said wheel lifting/lowering means includes a single plate and a pair of rods mounted on said single plate and insertable below said first wheel, said single plate being displaceable in a direction diametrical to said first wheel under the resiliency of a resilient member.

18. An apparatus according to claim 11, wherein said clamping means includes a pair of presser plates, at least one of said presser plates being displaceable by a third actuator for causing said presser plates to press and hold opposite side walls of said first wheel therebetween.

19. An apparatus according to claim 18, wherein said presser plate are operatively coupled to said third actuator through link means, said one of the presser plates is displaceable by said third actuator toward and away from one of the side walls of said first wheel, and the other presser plate is displaceable by said third actuator from a position held against the other side wall of said first wheel to a predetermined position and then angularly movable from said predetermined position, while being guided by guide groove means and rotatable bodies movably fitted therein.

20. An apparatus according to claim 19, wherein said third actuator comprises a cylinder, and further comprising a rotary plate angularly movable by said cylinder, said one presser plate being operatively coupled to said rotary plate by a pin and said other presser plate being operatively coupled to said rotary plate by said link means, said guide groove means comprising a straight guide groove and a shaped guide groove including a straight portion and an arcuate portion, the arrangement being such that said one presser plate is displaceable along said straight guide groove by said rotary plate which is angularly moved by said cylinder, and said other presser plate is displaceable and angularly movable along said shaped guide groove by said rotary plate which is angularly moved by said cylinder.

21. An apparatus according to claim 20, wherein said link means comprises a displaceable link, said link being displaceable from a position where said other presser plate starts being angularly displaced, toward said one wheel, the arrangement being such that when said other presser plate is displaced away from said one wheel by said rotary plate, said other presser plate is pressed toward the arcuate portion of said shaped guide groove through said displaceable link.

22. An apparatus according to claim 5, further comprising a support member which is movable at least vertically, said wheel transfer base means being mounted on said support member for movement along said first conveyor line, a movable base for reciprocally moving said wheel gripping means between said first and second conveyor lines, and coupling means on said movable base and said wheel transfer base means for coupling them to each other, the arrangement being such that when said support member is lifted to place said second wheel on said wheel transfer base means, said movable base and said wheel transfer base means are coupled to each other by said coupling means, and said wheel gripping means and said wheel transfer base means are moved in synchronism to a predetermined position by said movable base.

23. An apparatus according to claim 22, wherein said coupling means comprises a rod mounted on said movable base, an engaging member angularly movably supported on said wheel transfer base for engaging said rod, and a dog member for engaging said engaging member to angularly move the engaging member to release said rod from the engaging member.

24. An apparatus according to claim 23, wherein said wheel transfer base means has a stopper member, said engaging member being normally urged to engage said stopper member by a resilient member, said engaging member having an opening and an engaging pin, said dog member having an opening for receiving said engaging pin therein, the arrangement being such that said movable base and said wheel transfer base means are movable together with said rod fitted in said opening of said engaging member, and when said dog member engages said engaging member to angularly move said engaging member, said engaging pin of said engaging member is fitted in said opening of said dog member to position said engaging member in a predetermined angular position.

25. An apparatus according to claim 22, further comprising a fixed wheel receiving base mounted on said support member for rolling said second wheel from said wheel transfer base means over the fixed wheel receiving base onto said second conveyor line.

* * * * *